April 22, 1958  R. B. JOHNSON  2,832,014
SELENIUM RECTIFIER AND METHOD OF MAKING SUCH RECTIFIER
Filed June 6, 1955  2 Sheets-Sheet 1
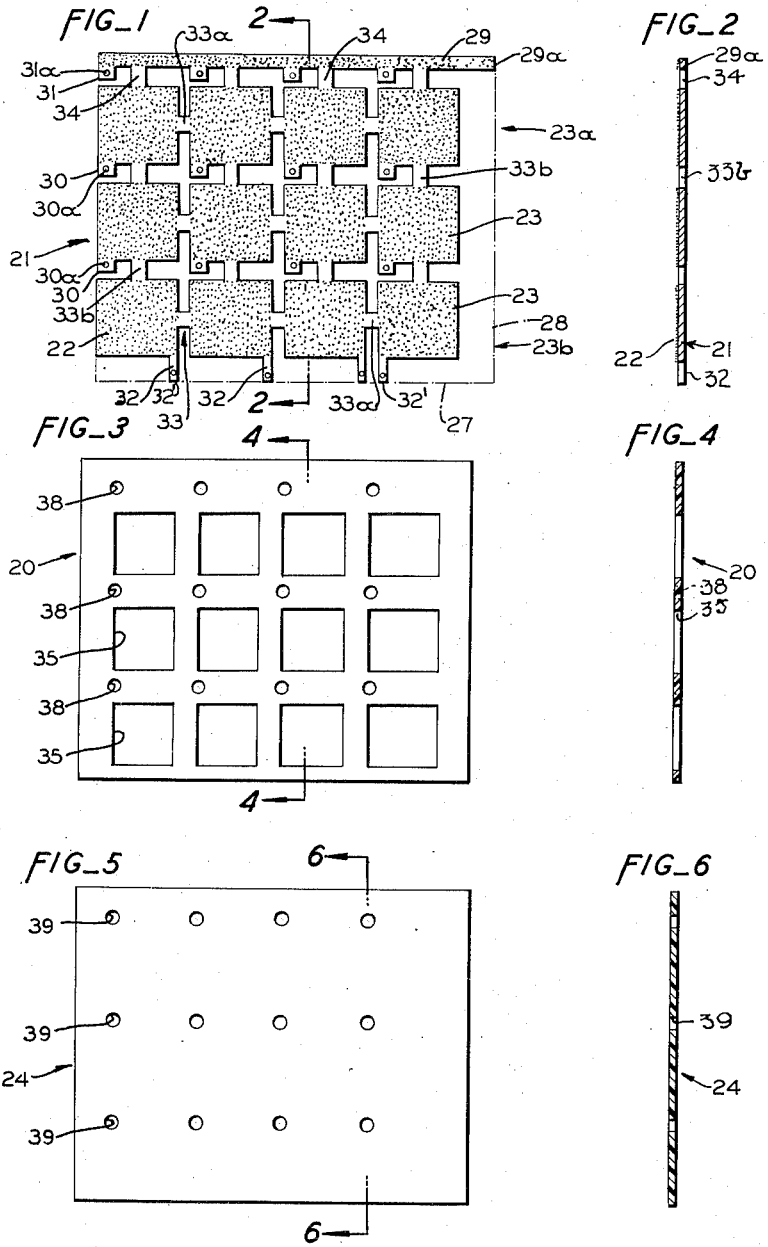
INVENTOR.
REYNOLD B. JOHNSON
BY
Hansen and Lane
ATTORNEYS April 22, 1958 R. B. JOHNSON 2,832,014
SELENIUM RECTIFIER AND METHOD OF MAKING SUCH RECTIFIER
Filed June 6, 1955 2 Sheets-Sheet 2
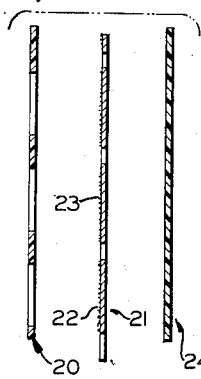
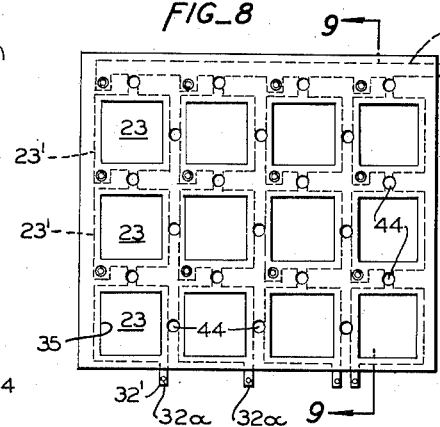
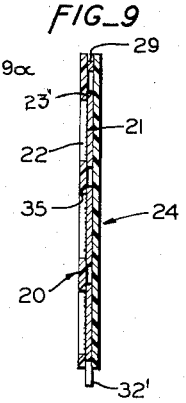
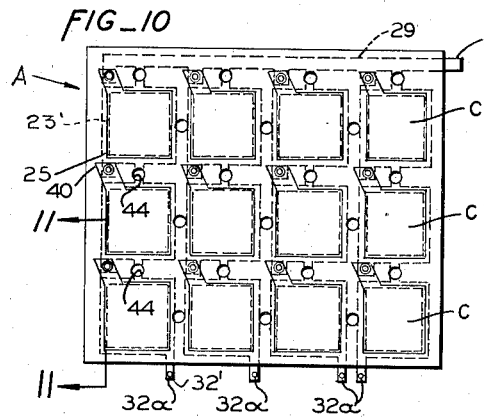
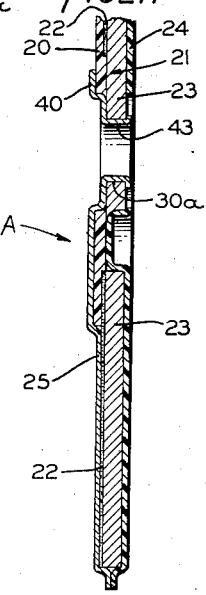
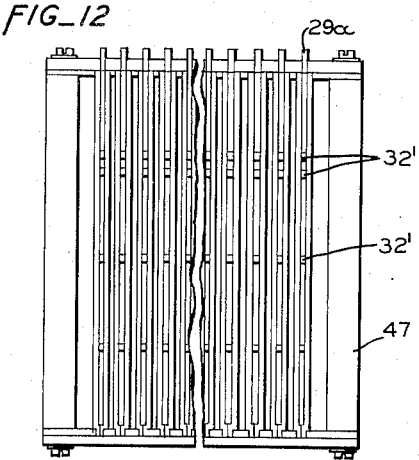
INVENTOR.
REYNOLD B. JOHNSON
BY
ATTORNEYS United States Patent Office 2,832,014
Patented Apr. 22, 1958

2,832,014

SELENIUM RECTIFIER AND METHOD OF MAKING SUCH RECTIFIER

Reynold B. Johnson, Palo Alto, Calif., assignor to International Business Machines Corporation, New York, N. Y., a corporation of New York Application June 6, 1955, Serial No. 513,503

12 Claims. (Cl. 317—234)

The present invention relates to rectifiers, and pertains more particularly to multiple-cell selenium rectifiers and to a method of manufacturing such rectifiers.

In the past it has been common practice to manufacture selenium type rectifiers from a plurality of cells connected together in series, wherein each cell consisted of a backing layer of metal of good electrical conductivity, an intermediate layer of selenium, and an overlying layer of a low melting point metal, such as solder or Wood's metal, of lower electrical conductivity than the backing layer.

An object of the present invention is to provide a new method for the manufacture of selenium type rectifiers.

Another object of the invention is to provide an assembly of backing metal, selenium, low melting point metal and insulative material so arranged and processed that upon completion, the assembly will comprise a sheet-like unit incorporating therein a plurality of series-connected selenium rectifier cells.

Another object of the invention is to provide a unitary assembly of selenium rectifier cells.

A further object is to provide a cell base assembly for a selenium-type rectifier wherein a plurality of cell bases are incorporated in co-planar, electrically isolated relation in a single planiform unit.

A further object is to assemble a single punched-out blank of selenium coated sheet metal with a cooperating covering of dielectric material, and then to sever predetermined portions of the assembly to leave a plurality of mechanically united, but electrically isolated cell bases, selenium coated portions of which are exposed through openings in the dielectric covering.

A further object is to apply a layer of electrically insulative covering material to a punched out, selenium coated base blank, the covering material having openings therein to expose predetermined coated areas of the base, said exposed, coated areas being covered with a low melting point metal, portions of the base blank being severed by holes through the base blank and the covering material to isolate portions of the base blank from each other.

These and other objects and advantages of the invention will be apparent from the following description and the accompanying drawings, consisting of two sheets, wherein:

Fig. 1 is an elevational view of a punched and pierced base blank of sheet metal of good electrical conductivity to be used as the central lamination of the cell unit, the shaded areas of said blank being coated with selenium.

Fig. 2 is a sectional view taken along line 2—2 of Fig. 1.

Fig. 3 is an elevational view of a punched and pierced sheet of insulative material to be used as the front lamination of the cell unit.

Fig. 4 is a sectional view taken along line 4—4 of of Fig. 3.

Fig. 5 is an elevational view of a pierced sheet of the insulative material to be used as a rear lamination of the cell unit.

Fig. 6 is a sectional view taken along line 6—6 of Fig. 5.

Fig. 7 is a composite sectional view of the three laminations shown in Figs. 1 to 6 inclusive, illustrating their relative positions for assembly.

Fig. 8 is a front elevational view of the three blanks shown in Fig. 7 when assembled, but before forming the dielectric outer laminations thereof.

Fig. 9 is a sectional view taken along line 9—9 of Fig. 8.

Fig. 10 is a front elevational view of the selenium rectifier unit completed from the assembly shown in Figs. 8 and 9.

Fig. 11 is an enlarged, fragmentary, sectional view taken along line 11—11 of Fig. 10 showing a preferred arrangement for connecting the cells in series.

Fig. 12 is a side elevational view of a multi-unit rectifier assembled from a plurality of completed units of the type shown in Figs. 10 and 11.

Referring to the drawings in detail, a selenium rectifier unit A (Figs. 10 and 11) exemplifying the present invention comprises, in general, a front lamination 20 of suitable dielectric material, a central lamination consisting of a punched out blank 21 of sheet metal of good electrical conductivity, a selenium coating 22 on each cell-base portion 23 of the metal blank 21, and a backing lamination 24 of suitable dielectric material. The cell base portions 23 of the metal blank 21, originally connected to each other by narrow integral strips of the central lamination, are severed from each other by the punching of holes through the assembled laminations in a manner to be described later herein. The selenium coatings 22 on the central lamination 21 are covered by individual overlay panels 25 of low-melting-point metal such as solder or Wood's metal.

The metal blank 21 is formed from a rectangular sheet metal work piece of good electrical conductivity, such as aluminum, having the original outlines indicated by the dash-one-dot lines 27 and 28 of Fig. 1. By conventional cutting or punching operations, the blank 21 is formed as shown in Fig. 1 to have an upper bus-bar portion 29, and a plurality of symmetrically arranged, cell-base portions 23. Each cell-base portion 23 except those in the lowermost row 23b thereof, has a depending terminal tab portion 30 formed integrally therewith. The bus bar portion 29 also has a plurality of similar depending terminal tab portions 31, one disposed above each of the cell base portions 23 in the upper row 23a thereof. Terminal tabs 32 also extend one from the lower edge of each square, cell-base portion 23 in the lowermost row 23b thereof. The tabs 31 and 32 are pierced by small holes, 31a and 32a, respectively (Fig. 1) for a reason which will be explained later herein. All of the terminal tab portions 30, 31 and 32 preferably are bare of selenium.

Each cell-base portion 23 of each metal blank 21 is connected by integral strips 33 to all adjacent cell base portions 23 both upwardly and downwardly and also laterally as viewed in Fig. 1. Similar strips 34 also connect the cell base portions 23 of the uppermost row 23a thereof to the bus bar portion 29.

Each front insulative lamination 20 is of a size to fit over the punched-out metal blank 21 so as to extend marginally slightly therebeyond as best shown in Fig. 8. The right hand end portion 29a of the bus bar portion 29 and the lower end portions 32′ of the bottom terminal tabs 32 (Figs. 8 and 10) however, project beyond the insulative laminations.

A plurality of openings 35 are provided in the front lamination 20 to expose the selenium coating 22 on each square cell base portion 23 when assembled with the metal blank 21 as shown in Figs. 8 to 11 inclusive. Each opening 35 preferably is slightly smaller than the cell base portion 23 which it overlies so as to mask a marginal portion 23' (Figs. 8, 9 and 10) around each cell base portion. The front lamination 20 extends across the intervening spaces between adjacent cell base portions 23, and also between the upper row 23a of cell base portions and the bus bar portions 29, covering also the interconnecting strips 33 and 34.

A plurality of small holes 38 also are provided in the front lamination 20 being concentric with each of the tab holes 30a and 31a in the central lamination 21 when the laminations 20, 21 and 24 are assembled as shown in Figs. 8 to 11 inclusive. The holes 38 in the front lamination 20 preferably are of a larger diameter than the tab holes 30a and 31a in the central lamination 20, so as to expose the terminal tabs 30 and 31 through the holes 38.

The rear lamination 24 may be of insulative material similar to that of the front lamination 20, and is substantially co-extensive therewith (Fig. 9). Holes 39, corresponding both in size and location with the holes 38 in the front lamination 20 are provided in the rear lamination 24 to expose therethrough the rear faces of the tabs 30 and 31.

If preferred, the insulative material comprising the front and back laminations may be applied to the metal blank 21 by molding, dipping or spraying in accordance with well known practices, and when so applied the various holes in such laminations would, of course, be provided by blocking off, masking or stripping in accordance with the well known and customary practices of the art. Regardless of whether the insulative material is applied in sheet or other form, in the resultant unit A the cell base portions 23 are supported in co-planar, isolated relation in a matrix or base of insulative material.

In the illustrated embodiment of the invention, the three laminations 20, 21 and 24 are assembled as shown in Figs. 8 and 9. When the front and rear laminations are of sheet material as illustrated, the assembled laminations are subjected to heat and pressure to deform one or both of the insulative laminations 20 and 24 into the punched out portions of the central lamination 21, and also marginally around all edge portions of the central lamination 20 with the exception of the projecting end portion 29a of the bus bar 29, and the lower end portions 32' of the terminal strips 32.

At this stage of fabrication, each of the cell base portions 23 of the metal blank 21 remain integrally interconnected with each other and with the bus bar 29 by the strips 33 and 34. To sever the direct interconnections provided by these strips, and to isolate the cell base portions electrically from each other and from the bus bar 29, holes 44 (Figs. 8 and 10) of greater diameter than the width of the strips 33 are provided through the assembled laminations 20, 21 and 24 and centrally through each of the strips 33 and 34 to sever all of these strips. Completion of this operation leaves the cell base units 23 electrically isolated from each other, but mechanically supported and interconnected by the insulative material in which they are mounted as explained previously herein.

The overlay panels 25 of low melting point metal, such as solder or Wood's metal, are applied one over the selenium coating 22 of each cell base portion 23 which is exposed through an opening 35 in the front lamination 20. A terminal tab 40 is formed integrally with each overlay panel 25 to extend over the hole 38 in register with tab 30 or 31 of the next upper cell base portion 23, or of the bus bar 29, as viewed in Figs. 1 and 7 to 11 inclusive.

Each panel tab 40 is deformed into the hole 38 which it overlies to contact the exposed tab 30 or 31 therein, and is riveted at 43 (Fig. 11) through the small tab hole 30a or 31a.

Each cell base portion 23, its selenium coating 22 and overlying panel 25 comprises a single selenium cell C (Fig. 10) and the cells C thus formed are connected in series in upwardly extending rows as shown in Figs. 8 to 11, inclusive, the uppermost cell of each row being connected by overlay panel tab 40 to the bus bar. Tracing the circuit through one of these rows of cells, each lower terminal tab 32 is integral with its cell base portion 23, whence the circuit passes through the selenium coating 22 thereon, through the low melting point metal panel 25 overlying the selenium coating, and then, as best shown in Fig. 11, through the tab 40 of the panel 25 to the terminal tab 30 of the next upwardly adjacent cell base portion 23. This series arrangement is repeated in upwardly extending sequence through each of the cells C until connection is made by the terminal tab 40 of the panel 25 of the uppermost cell C to the bus bar 29, which electrically interconnects the upper ends of all of the rows of cells C.

It is obvious, of course, that the specific circuit grouping of the cells C within a unit A may be varied according to the requirements of each rectifier embodying the invention and made in accordance with the invention.

For mounting a plurality of the rectifier units A in battery, they may be assembled in a suitable frame, such as the frame 47 as shown in Fig. 12, wherein the exposed end portions 29a of the bus bar portions 29 are directed upwardly and the exposed end portions 32' of the lower terminal tabs 32 are directed toward the viewer.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims.

I claim:

1. A cell base assembly for a selenium rectifier comprising a plurality of marginally separated metal cell base portions supported in co-planar, spaced apart relation between a pair of sheets of insulative material, said sheets being sealed together marginally of said cell base portions, a face and an edge portion of each cell base portion being exposed.

2. A cell base assembly for a selenium rectifier comprising a plurality of sheet metal cell base members embedded in co-planar, spaced apart relation between a pair of sheets of insulative material with one face of each cell base member exposed, and a coating of selenium on the exposed face of each cell base member.

3. A cell base assembly for a selenium rectifier comprising a plurality of similar, sheet metal cell base portions supported in co-planar, spaced apart relation, a sheet of insulative material covering one face of each cell base portion and spanning the spaces therebetween, a selenium coating on the other face of each cell base portion, the insulative covering material having a plurality of holes therein, the edges of the holes being co-incident with edge portions of adjacent cell base portions.

4. A selenium type rectifier unit comprising a plurality of individual cell base portions of metal of good electrical conductivity arranged in laterally spaced relation, a coating of selenium on one face of each cell base portion, a layer of insulative material covering the other face and edges of each cell base portion, a selenium coated portion of each cell base portion being free of insulative material, the insulative layer having holes therethrough between adjacent cell base portions to expose edge portions of the adjacent cell base portions, a panel of low melting point metal overlying the exposed selenium coating of a cell base portion, and means electrically connecting each overlying panel to an adjacent cell base portion to provide a plurality of selenium rectifier cells connected together in series within the unit.

5. A selenium type rectifier unit comprising a plurality of individual cell base portions of metal of good electrical conductivity arranged in laterally spaced relation, integral narrow strips interconnecting each cell base portion to an adjacent cell base portion, a coating of selenium on the front face of each cell base portion, a layer of insulative material spanning the spaces between adjacent cell base portions, the selenium coating on said cell base portions being clear of insulative material, a panel of low melting point metal overlying the exposed selenium coating of each cell base portion, and electrically conductive means connecting each overlying panel to an adjacent cell base portion, whereby, upon severance of said interconnecting strips, a plurality of selenium rectifier cells are provided connected together in series within the unit.

6. A selenium type rectifier unit comprising a plurality of individual cell base portions of metal of good electrical conductivity arranged in laterally spaced, coplanar relation, a coating of selenium on the front face of each cell base portion, a front covering of insulative material spanning the spaces between adjacent cell base portions and having openings therein exposing the selenium coating on the front face of each cell base portion, a rear covering of insulative material covering the rear faces of said cell base portions and spanning the spaces therebetween, a panel of low-melting-point metal overlying the exposed selenium coating of each cell base portion, and electrical conductor means connecting each overlying panel to an adjacent cell base portion to provide a plurality of selenium rectifier cells connected together in series within the unit.

7. A selenium type rectifier unit comprising a central lamination of sheet metal punched out to form a plurality of individual cell base portions arranged in laterally spaced, co-planar relation and interconnected to each other by narrow, integral strips of the same metal, a coating of selenium on the front face of each cell base portion, a front lamination of insulative material substantially co-extensive with the central lamination and having openings therein exposing the selenium coating on the front face of each cell base portion, a rear lamination of insulative material substantially co-extensive with the front lamination, the front and rear lamination being deformed and fused together marginally around the edge portions of the central lamination, all three laminations having a hole therethrough centrally of each narrow connecting strip of the central lamination, the hole being of a diameter greater than the width of the strip to sever the strip, a panel of low melting point metal overlying the exposed selenium coating of each cell base portion, and electrically conductive means connecting an overlying panel to an adjacent cell base portion to provide a plurality of selenium rectifier cells connected together in series within the unit.

8. A selenium type rectifier unit comprising a sheet metal cell base blank punched out to form a plurality of individual cell base portions arranged in laterally spaced, co-planar relation and interconnected to each other by narrow integral strips of the same material, a coating of selenium on the front face of each cell base portion, a layer of insulative material covering the entire rear area of the cell base blank, the rear covering and the cell base blank having a hole therethrough centrally of each narrow interconnecting strip, each hole being of a diameter greater than the width of the strip to sever the strip, a panel of low melting point metal overlying the selenium coating on the front of each cell base portion, and electrically conductive means connecting each overlying panel to an adjacent cell base portion to provide a plurality of selenium rectifier cells connected together in series within the unit.

9. A sheet-like multiple cell base unit for a selenium rectifier comprising a plurality of sheet metal cell base units arranged in rows in co-planar, laterally spaced relation, a terminal tab on each cell base unit, a selenium coating on a face of each cell base unit, a bus bar mounted transversely of a plurality of the rows of cell base units, a plurality of terminal tabs on the bus bar, and a layer of insulative material embedding the cell base units and the bus bar therein, the selenium coating on each cell base unit and a portion of each cell base and bus bar terminal tab being clear of insulative material.

10. A multi-cell, selenium rectifier unit comprising a plurality of sheet metal cell base units arranged in rows in co-planar, laterally spaced relation, a terminal tab on each cell base unit, a selenium coating on a face of each cell base unit, a bus bar mounted transversely of a plurality of the rows of cell base units, a plurality of terminal tabs on the bus bar, a layer of insulative material embedding the cell base units and the bus bar therein, the selenium coating on each cell base unit and a portion of each cell base and bus bar terminal being clear of insulative material, a panel of low-melting-point metal applied over the selenium coating of each cell base unit, a tab formed integrally with each low-melting-point metal panel and extending therefrom, means connecting a plurality of the low-melting-point metal panel tabs to the terminal tabs of adjacent cell base units in the same row therewith, and means connecting another low-melting-point metal panel tab to a bus bar terminal tab.

11. The method of constructing a multi-cell, selenium type rectifier unit which comprises forming a unitary sheet metal cell base blank comprising a plurality of laterally spaced cell base portions interconnected by integral, narrow strips, coating with selenium a face of each cell base portion, setting the uncoated side of the blank thus formed in a unitary layer of insulative material with the selenium coated face of each cell base portion exposed, and piercing the insulative material and the connecting strips to sever the connecting strips, thereby leaving the cell base portions supported in the unitary layer of insulative material with the selenium coated face of each cell base portion exposed and the cell base portions electrically isolated from each other.

12. The method of constructing a base assembly for a multi-cell selenium type rectifier unit which comprises forming a selenium coated sheet metal cell base blank of laterally spaced cell base portions joined to adjacent cell base portions of the blank by integral, narrow connecting strips, applying laminating sheets of insulative material to both faces of the cell base blank, one of said laminating sheets having a plurality of openings therein to expose selenium coated cell base portions of the cell base blank, forming the laminating sheets to conform to the cell base blank, adhering together superposed formed portions of the laminating sheets, and piercing the laminating sheets and the connecting strips at each connecting strip to sever the connecting strips and thus to leave the cell base portions supported in the insulative material in electrically isolated relation to each other, with the severed ends of the connecting strips exposed within the piercings.

References Cited in the file of this patent
UNITED STATES PATENTS

| | | |
|---|---|---|
| 2,137,831 | Brunke | Nov. 22, 1938 |
| 2,428,537 | Veszi et al. | Oct. 7, 1947 |
| 2,498,890 | Kotterman | Feb. 28, 1950 |
| 2,510,588 | Kotterman | June 6, 1950 |
| 2,622,957 | Eisler | Dec. 15, 1953 |
| 2,697,188 | Goldman et al. | Dec. 14, 1954 |